US008622793B2

(12) United States Patent
Ford

(10) Patent No.: US 8,622,793 B2

(45) Date of Patent: Jan. 7, 2014

(54) PLAYER MADE TOURNAMENT APPLICATION AND METHOD

(75) Inventor: John J. Ford, Oakland, CA (US)

(73) Assignee: BAM Software and Services, LLC, Emeryville, CA (US)

( * ) Notice: Subject to any disclaimer, the term of this patent is extended or adjusted under 35 U.S.C. 154(b) by 202 days.

(21) Appl. No.: 13/028,952

(22) Filed: Feb. 16, 2011

(65) Prior Publication Data

US 2011/0256913 A1 Oct. 20, 2011

Related U.S. Application Data

(60) Provisional application No. 61/338,240, filed on Feb. 16, 2010.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC ................. 463/6; 273/292; 273/139; 463/16; 463/35; 463/40; 463/41; 463/42; 463/43

(58) Field of Classification Search

USPC ................... 273/95, 138, 121, 141, 139, 292; 364/412; 463/6, 16, 35, 40, 41, 42, 43

See application file for complete search history.

(56) References Cited

U.S. PATENT DOCUMENTS

| | | | | |
|---|---|---|---|---|
| 7,311,600 | B2 | 12/2007 | Sundstrom | |
| 7,798,901 | B2 | 9/2010 | Nguyen et al. | |
| 2002/0068633 | A1 * | 6/2002 | Schlaifer | 463/43 |
| 2002/0077712 | A1 * | 6/2002 | Safaei et al. | 700/93 |
| 2004/0063484 | A1 * | 4/2004 | Dreaper et al. | 463/16 |
| 2006/0287099 | A1 * | 12/2006 | Shaw et al. | 463/42 |
| 2007/0167210 | A1 * | 7/2007 | Kelly et al. | 463/16 |
| 2008/0167120 | A1 * | 7/2008 | Spyres et al. | 463/25 |
| 2008/0268959 | A1 | 10/2008 | Bryson et al. | |
| 2009/0082113 | A1 | 3/2009 | Kim et al. | |

* cited by examiner

*Primary Examiner* — Omkar Deodhar
*Assistant Examiner* — Adetokunbo O Torimiro
(74) *Attorney, Agent, or Firm* — Greenberg Traurig LLP

(57) ABSTRACT

Some embodiments of invention provide a method for creating a player made tournament. The method can comprise displaying a tournament creation page including a plurality of variables and at least one option for each of the plurality of variables. Some embodiments further provide receiving the at least one option for each of the plurality of variables. In some embodiments, operational parameters of the player made tournament can substantially comprise the at least one option for each of the plurality of variables received. Some further embodiments provide processing the operational parameters to create a player made tournament, and then displaying the player made tournament on a tournament main page.

3 Claims, 10 Drawing Sheets

PLAYER MADE TOURNAMENT APPLICATION AND METHOD

This application claims priority under 35 U.S.C. §119 to U.S. Provisional Patent Application No. 61/338,240 filed on Feb. 16, 2010, the entire contents of which is incorporated herein by reference.

BACKGROUND

Racetracks and online operators in the racing industry can conduct handicapping tournaments or contests where people pay an entry fee and deposit a "bankroll" from which to make tournament wagers. Sometimes, at least a portion of the entry fee can be used to pay at least a portion of the winner's proceeds. The track or operator can set the rules for the contest, typically mandating the amount of each bet, how many bets need to be made, the type of bet which needs to be made (e.g., win, exacta, trifecta etc.). Customers can enter the tournament, make wagers, and the customer with the largest bankroll and/or the best return on investment (ROI) at the end of the tournament can be the winner.

SUMMARY

Some embodiments of invention provide a method for creating a player made tournament. The method can comprise displaying a tournament creation page including a plurality of variables and at least one option for each of the plurality of variables. Some embodiments further provide receiving the at least one option for each of the plurality of variables. In some embodiments, operational parameters of the player made tournament can substantially comprise the at least one option for each of the plurality of variables. Some further embodiments can provide processing the operational parameters to create a player made tournament, and then displaying the player made tournament on a tournament main page.

Some embodiments of invention provide a method for creating a player made tournament for real-life sporting events. The method can comprise receiving a request to create a player made tournament for real-life sporting events and displaying a tournament creation page including a plurality of variables and at least one field corresponding to each of the plurality of variables. The at least one field can be configured to receive an option for the corresponding variable. Some embodiments can further provide receiving options for each of the plurality of variables and operational parameters for the player made tournament for real-life sporting events can substantially comprise the options received. Some further embodiments can provide processing the operational parameters to create a player made tournament for real-life sporting events and then can provide displaying the player made tournament for real-life sporting events on a tournament main page. Some embodiments can provide that the tournament main page can include a display of at least a portion of the operational parameters of the player made tournament for real-life sporting events and further embodiments can provide receiving requests to participate in the player made tournament for real-life sporting events.

Some embodiments of the invention provide a system for creating a player made tournament and the system can comprise at least one computer server having a processing unit and a database. In some embodiments, the at least one computer server can be configured to receive and process a request to create a player made tournament and display a tournament creation page in response to the request to create a player made tournament. The tournament creation page can include a plurality of variables and at least one option for each of the plurality of variables. Some embodiments provide that the at least one computer server can also be configured to receive the at least one option for each of the plurality of variables, which can comprise operational parameters of the player made tournament. Further, the computer server also can be configured to process the operational parameters with the processing unit to create a player made tournament, store the operational parameters in the database of the computer server, and display the player made tournament on a tournament main page.

DETAILED DESCRIPTION

Figure 1:
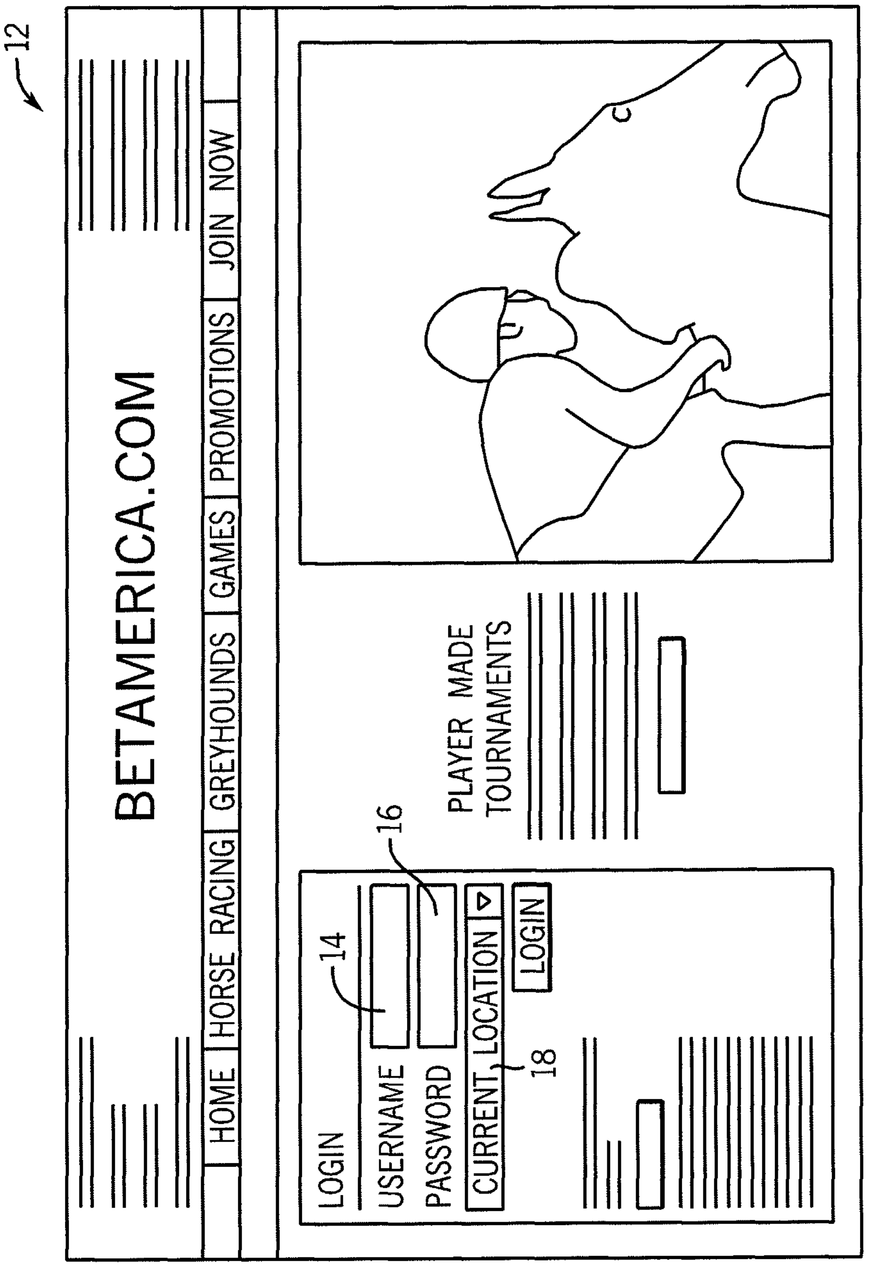
FIG. 1 is a "login main page" screen shot from a web-based program controlled by a player made tournament application according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Some embodiments of the invention provide a player made tournament application to allow users to create personalized handicapping tournaments, contests, and other similar competitive events. Tournaments can be based on real sporting events. In some embodiments, users can permit real betting and actual transfer of monetary funds as a result of the betting.

In some embodiments, the application can include computer program code that is executable by a processor of a computer (e.g., personal computer, laptop, gaming machine, smart phone, etc.) and/or a processing unit of a server and can be accessed by a user via the computer. The computer can be in communication with the server via a network to receive and transmit information through a web-based program controlled by the application. This information, such as tournament variables, user information, and other program information, as further described below, can be stored on a computer-readable medium of the computer (e.g., a computer storage unit) and/or on a computer-readable medium of the server (e.g., a server database). In some embodiments, the entire application or a portion of the application can be stored on the computer. In other embodiments, the entire application or a portion of the application can be stored on the server and can be accessed by the computer when the server and the computer are connected via the common network.

In some embodiments, a user can create a tournament either directly through the application stored on the computer or through the application on the server via the web-based program. The application can allow the user to create personalized tournaments to suit the user's personal interests. For example, the user can personalize the tournament by including and defining a number of variables. In some embodiments, the variables can comprise a number of users allowed, an entry fee and prize pool, a bankroll, specific event details (e.g., tracks or races), a minimum wager amount, bet types, tournament length, and other related variables. In some embodiments, some of the different options for tournament variables can be predetermined so that the user can choose from the predetermined options for at least some of the variables.

In some embodiments, the user can become a member of the web-based program in order to create the tournament via the application. For example, the user can create a profile. In the user's profile, the user can input their personal information including physical and e-mail addresses, phone numbers, financial institution information, and other similar biographical information. Further, the user's profile can be used to keep track of information such as wager history, withdrawal history, account history, and other financial and biographical histories. After creating a user profile, in some embodiments, the user can create tournaments, among other possible user options. Once the user creates a tournament, as described in more detail below, the tournament can be available to other users, including the user's friends or other web-based program members (e.g., users using different computers connected to the server via the network) so that others can request to join the tournament. More specifically, the user's friends or other members of the web-based program can then join the tournament, and can become contestants in the user's player made tournament.

Each contestant can provide necessary funds to join the tournament, such as a bankroll and an entry fee. For example, each contestant can remit funds into a tournament bankroll account and a pool entry fee account associated with each tournament (i.e., each player made tournament can include its own pool entry fee account and its own bankroll account). Information about the bankroll accounts and pool entry fee accounts can be stored in the database on the server.

Further, in some embodiments, users can create personal member accounts, and information regarding the personal member accounts can be stored in the database. In some embodiments, the personal member account can function substantially as an intermediary between the users' personal funds sources (i.e., bank accounts, credit card accounts, or other similar accounts) and the bankroll and pool entry fee accounts. More specifically, in some embodiments, initially, funds can be transferred from the user's personal funds sources into the user's personal member account associated with the web-based program. Then, in some embodiments, funds can be transferred from the personal member account into the bankroll accounts and pool entry fee accounts for each tournament the user joins and/or creates.

In some embodiments, the pool entry fee account can include a prize pool (e.g., a $10 entry from each of 10 users results in a $100 prize pool) and the prize pool can be awarded to a tournament winner or winners at the end of the tournament. For example, the entire prize pool can be awarded to the tournament winner, or can be divided among a top number of contestants. In some embodiments, the user can personalize how the prize pool is awarded during creation of the tournament (e.g., how many top contestants will receive a portion of the prize pool, how portions of the prize pool are split between top contestants, how portions of the prize pool are split in tie situations, etc.). The bankroll account can be accessed by the user throughout the tournament (e.g., to permit live betting), and whatever funds remaining in the member's bankroll account at the end of the tournament can be returned to their personal member accounts.

Moreover, in some embodiments, the web-based program can comprise both guaranteed-prize and non-guaranteed-prize tournaments. More specifically, in some embodiments, a non-guaranteed-prize tournament can comprise, as previously mentioned, tournaments where the prize pool can vary depending on the number of contestants who enter so that the minimum amount of prize money can be zero, if no users join the tournament. In some embodiments, the web-based program can guarantee the minimum amount of the prize pool, so that regardless of the number of contestants, and their respective contributions to the pool entry fees, the prize pool will include some dollar value greater than zero (i.e., a guaranteed prize pool).

The following paragraphs describe a web-based program controlled by the application according to some embodiments of the invention.

In some embodiments, a user can access the web-based program 10 via a computer and can "log in" to the application through the web-based program. FIG. 1 illustrates a login page 12 displayed by the web-based program 10, as controlled by the application. In some embodiments, during the process of becoming a member of the web-based program 10, the user can create a username and a password, so that when the user wishes to gain access to the web-based program 10, the user can input their username and their password into the username field 14 and password field 16 on the login page 12.

Additionally, in some embodiments, the user can select from which state in the United States the user is accessing the site. For example, the user can select their current location from a "drop-down" current location list 18 on the login page 12.

Figure 2:
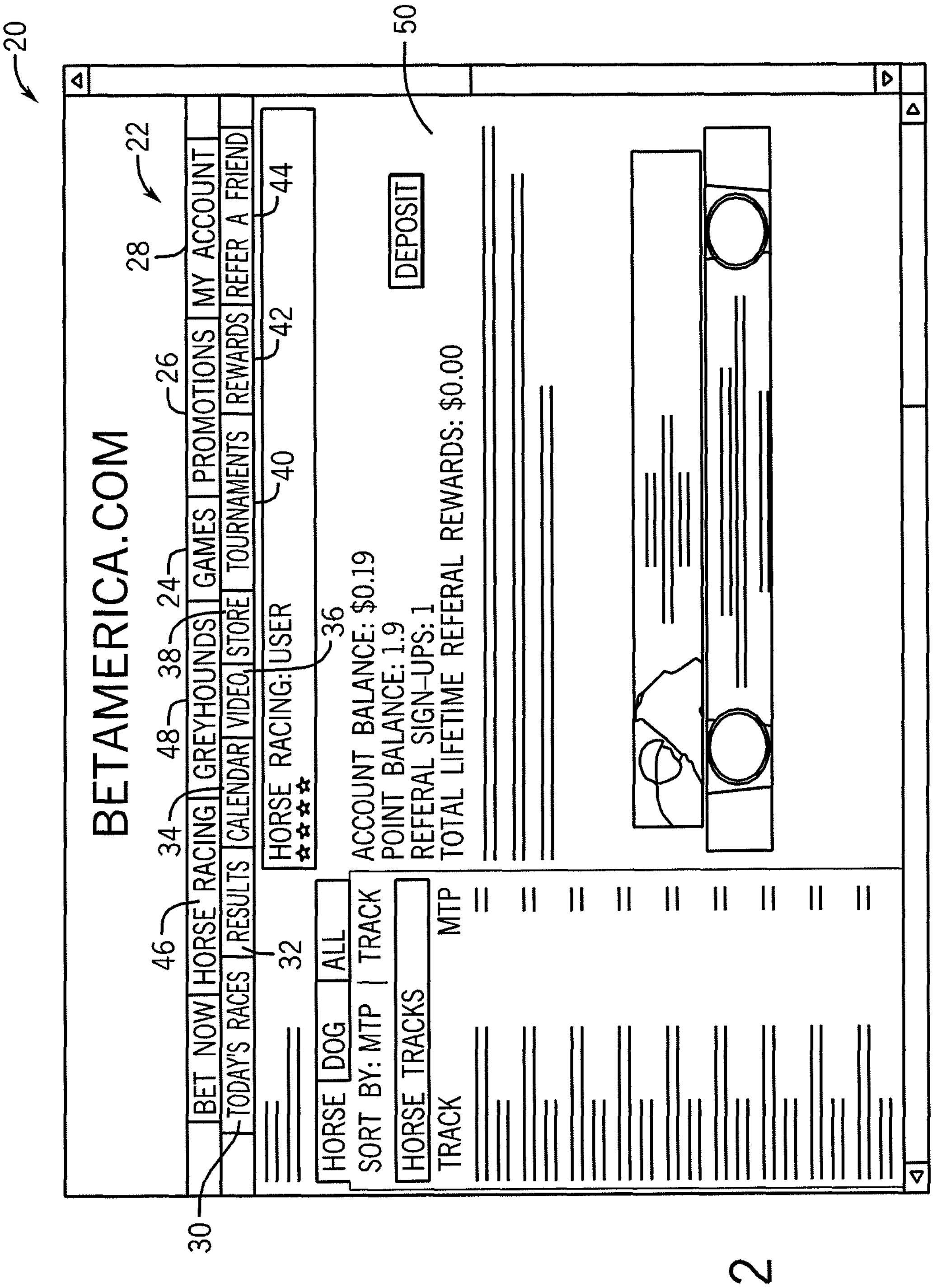
FIG. 2 is a "main menu page" screen shot from a web-based program controlled by the player made tournament application.

According to some embodiments of the invention, as shown in FIG. 2, after logging in to the web-based program 10, the user can make their initial selections from a main-menu page 20. In some embodiments, the main-menu page 20 can be sport-specific. For example, as shown in FIG. 2, in some embodiments, the main-menu page can comprise information regarding horse racing, and in other embodiments, the main-menu page can comprise information regarding other sports, such as dog racing. In some embodiments, the user can toggle between the main-menu pages 20 comprising horse racing information and the main menu page comprising information regarding dog racing by selecting horse racing 46 and greyhounds 48, respectively, in the main menu 22.

In some embodiments, the main-menu page can include a main menu 22. The main menu 22 can include several pages to which the user can navigate. For example, the user can navigate to fantasy sports pages 24, other games 26, a my account page 28 (i.e., a page including the user's history and biographical information), a listing of the current day's races 30, a listing of results from recent races 32, a calendar of recent and future racing events 34, a live video link 36 (i.e., users using different computers connected to the server via the network can view video images of live races through the web-based program), a store page 38, a tournament main page 40, a rewards page 42, and a refer-a-friend page 44. In some embodiments, the main-menu page 20 can comprise more options to which a user can navigate, and in other embodiments, the main-menu page 20 can comprise fewer options. Furthermore, in some embodiments, many of the different pages of the web-based program 10 can include a substantially similar main menu 22.

Also, in some embodiments, the main-menu page 20 can include a user-data frame 50. More specifically the user-data frame 50 can comprise information related to the user's personal member account and other funds information. For example, the user-data frame 24 can include information such as, but not limited to, the user's personal member account balance, point balance, referral sign-ups, and lifetime referral rewards. The main-menu page 20 can further include other potentially useful information such as pick of the day (i.e., a racing expert providing helpful information on wager selection), carryover selections, and a display of track locations and schedules.

Figure 3A:
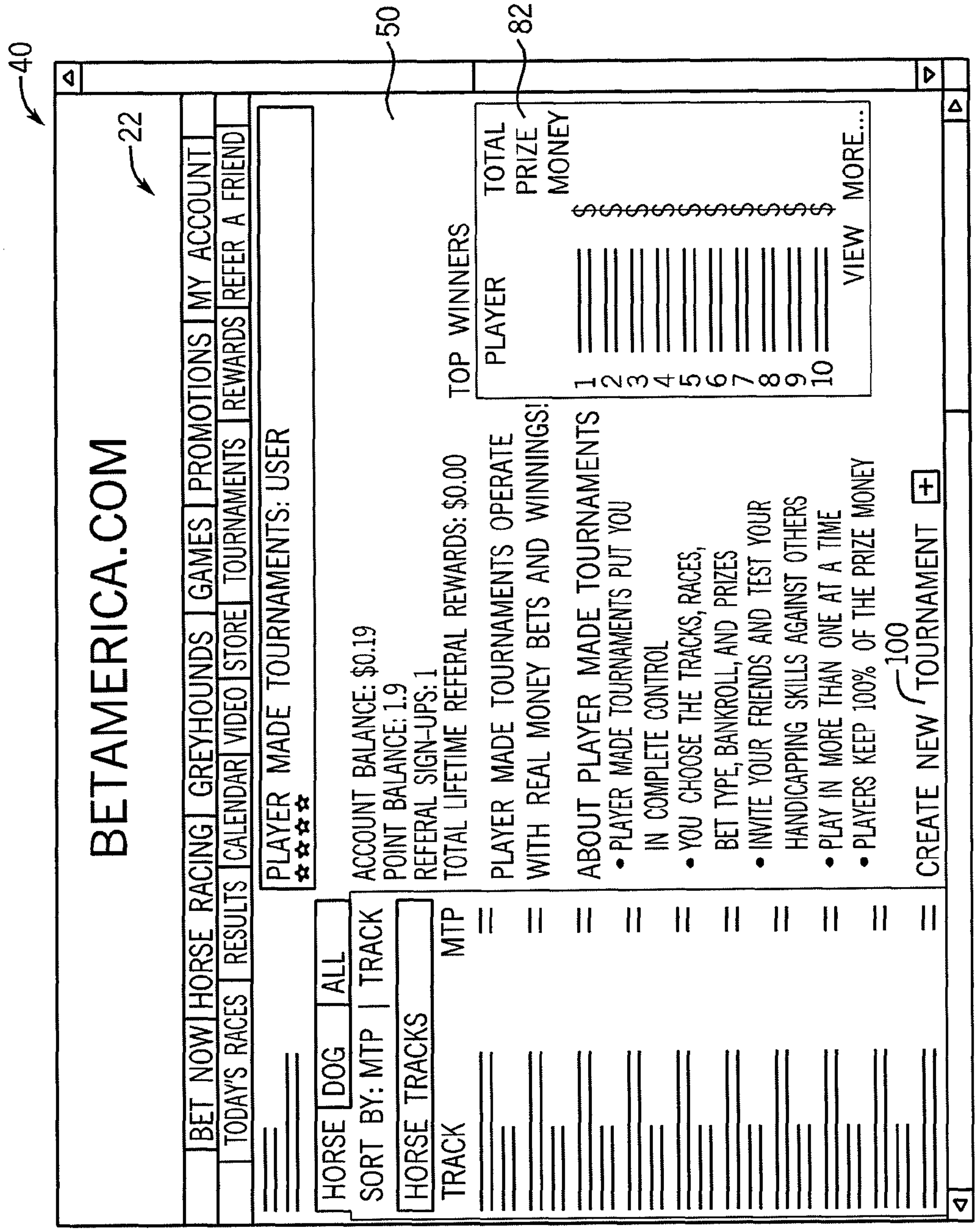
FIGS. 3A and 3B are portions of a "tournament main menu page" screen shot from a web-based program controlled by the player made tournament application.
Figure 3B:
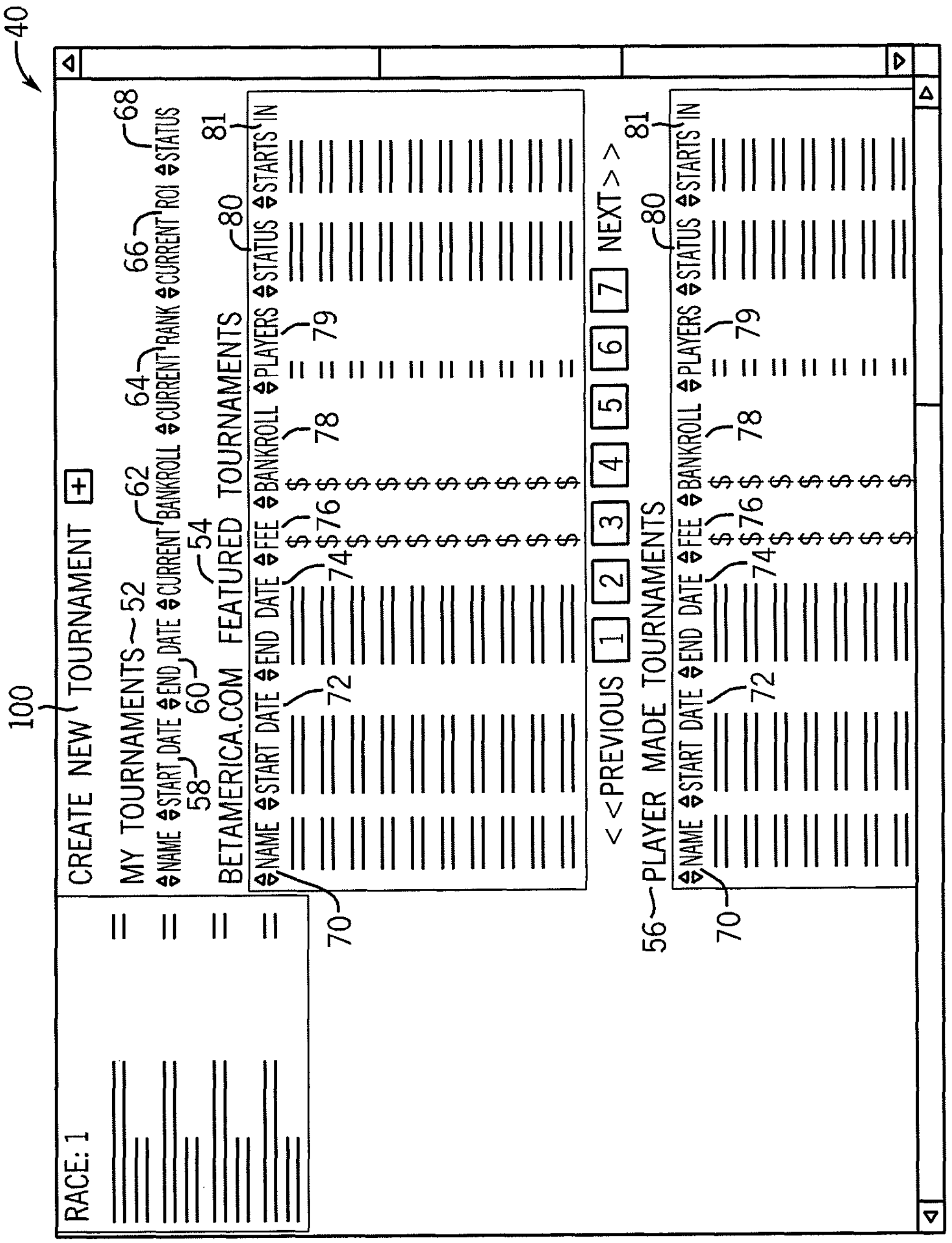

According to some embodiments of the invention, if the user wishes to enter, create, or learn about tournaments, they can navigate to the tournament main page 40. From the tournament main page 40, the user can view a "My Tournaments" table 52. For example, in some embodiments, the "My Tournaments" table 52 can comprise tournaments in which the user is participating. Also, in some embodiments, the tournament main page 40 can comprise a "Featured Tournaments" table 54 and a "Player Made Tournaments" table 56. In some embodiments, the "Featured Tournaments" table 54 can comprise tournaments created by the web-based program in which substantially all users can participate. Further, in some embodiments, the "Player Made Tournaments" table 56 can comprise tournaments created by users in which other users can participate. As shown in FIG. 3, the user can view information about tournaments, including operational parameter data, such as start dates 58, end dates 60, current bankrolls 62, current rank 64 (i.e., among all contestants in the tournament), current return on investment 66 (ROI), and status 68 in the "My Tournaments" table 52. Also, as shown in FIGS. 3A and 3B, the user can view tournament names 70 and information about tournaments they have yet to join including start dates 72, end dates 74, entry fees 76, bankrolls 78, number of players participating 79, tournament statuses 80, and a "starts in" entry 81 (i.e., a countdown timer letting users know about how much time remains before the tournament begins) via the "Featured Tournaments" table 54 and the "Player Made Tournaments" table 56. Additionally, in some embodiments, the tournament main page 40 can include a "Top Winners" table 82, which can display the total prize money won by players in descending order from most earned downward.

Figure 4:
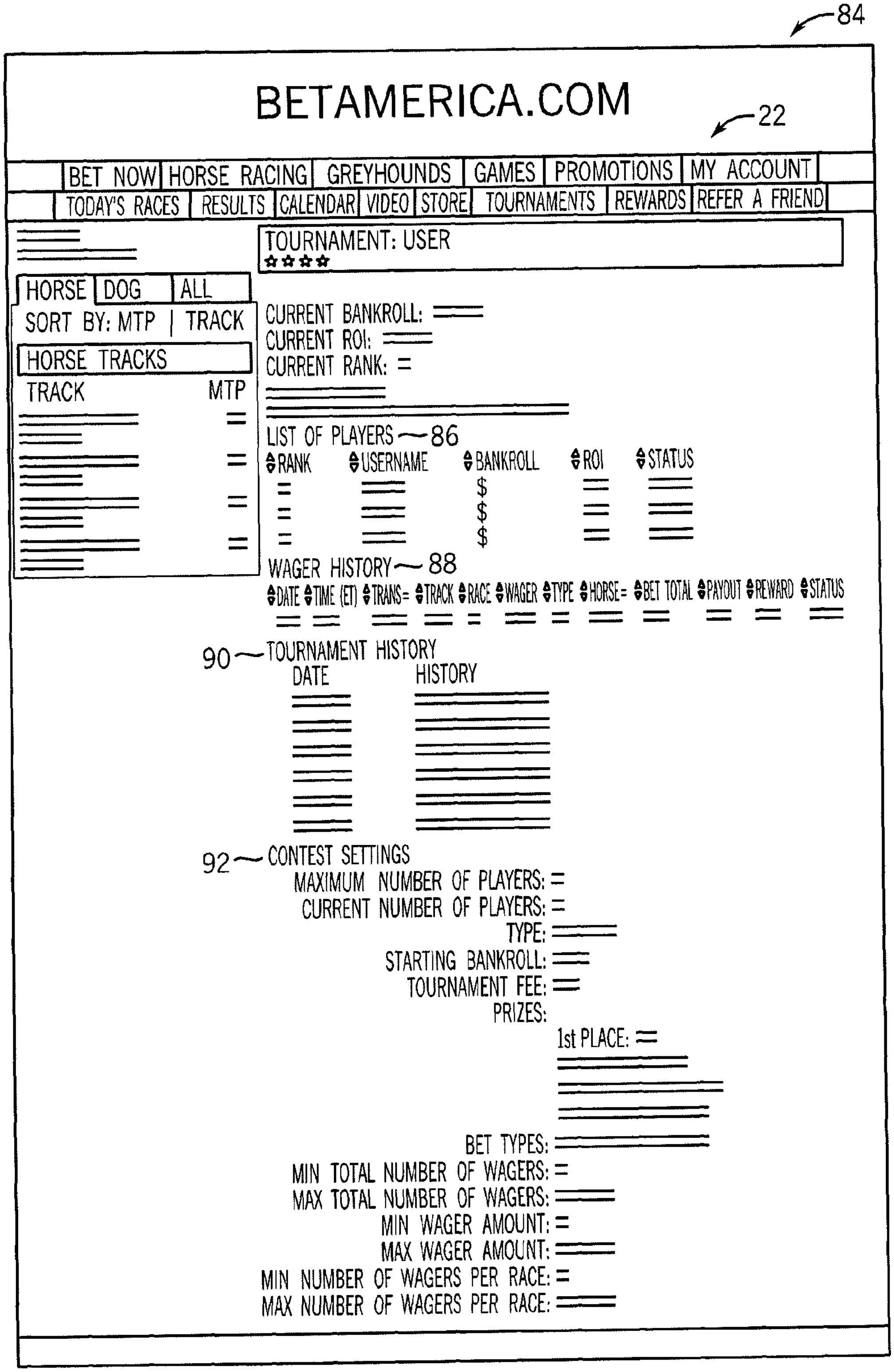
FIG. 4 is a "tournament detail page" screen shot from a web-based program controlled by the player made tournament application.

FIG. 4 illustrates a tournament detail page 84 displayed by the web-based program, as controlled by the application. In some embodiments, through the tournament detail page 84, the user can view more details of particular tournaments that they joined or that they may join by selecting one of the tournaments listed in one of the tables 52, 54, 56. In some embodiments, the tournament detail page 84 can include generally relevant information about the selected tournament, such as, operational parameters of the selected tournament. For example, in some embodiments, the tournament detail page 84 can include information such as current players 86 (i.e., users who are already contestants in this tournament), wager history 88 of the tournament, tournament history 90, and contest settings 92 (i.e., the operational parameters of the tournament such as bankroll, prize pool, prize distribution, bet types, etc.). In some embodiments, users can view this information in order to make informed decisions about whether they wish to join or continue to participate in the selected tournament. In some embodiments, the users viewing the tournament detail page 84 can decide to submit a request to participate in the tournament selected, although, users need not view the tournament detail page 84 to participate in the selected tournament. In some embodiments, a user may not be satisfied or find acceptable the information on the tournament detail page 84 so that the user may wish to create their own tournament with the user's own operational parameters.

Figure 5A:
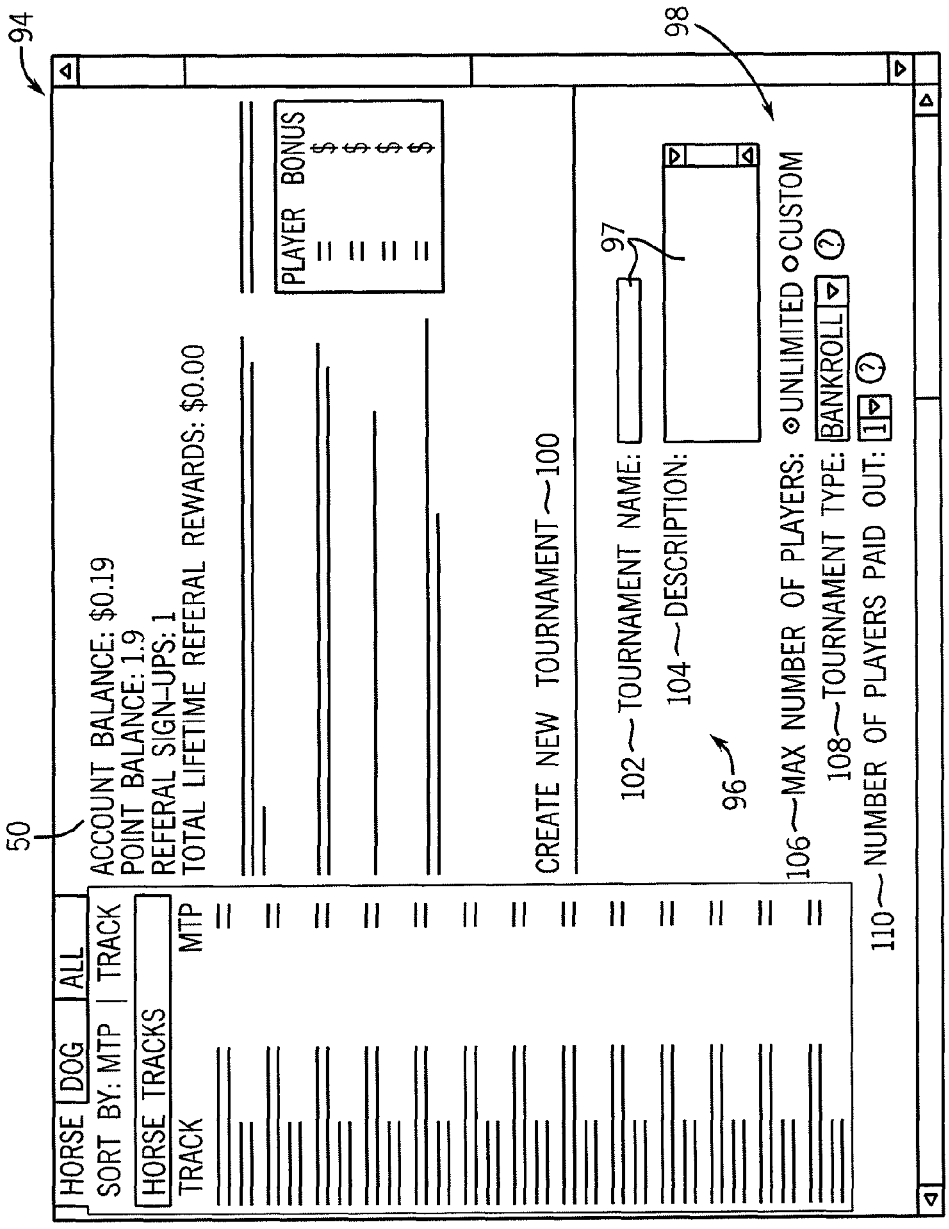
FIGS. 5A and 5B are portions of a "tournament creation page" screen shot from a web-based program controlled by the player made tournament application.
Figure 5B:
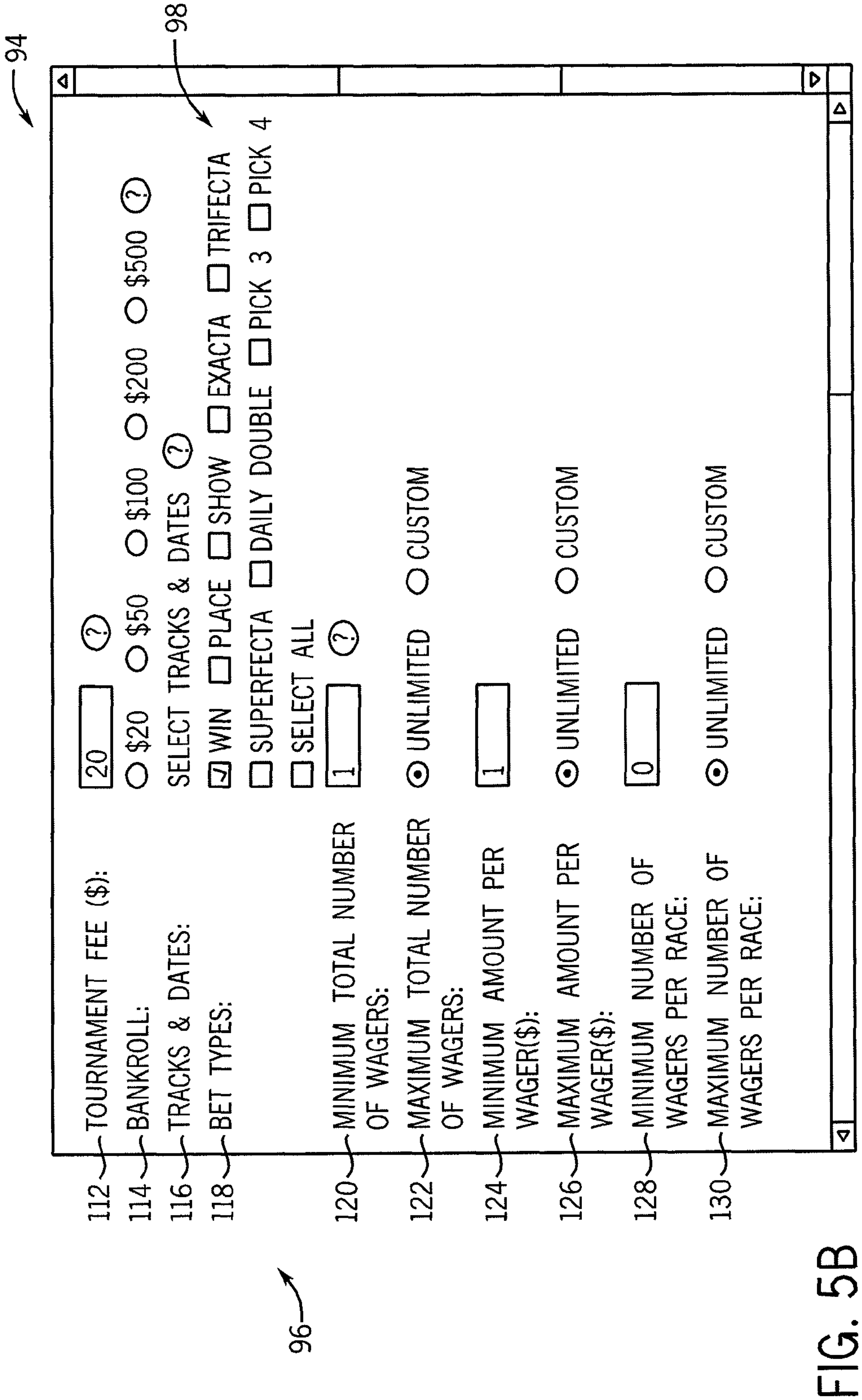

In some embodiments, as shown in FIGS. 5A and 5B, the user can navigate to a tournament creation page 94 displayed by the web-based program, as controlled by the application. Through the tournament creation page 94, the user can create their own tournament. In some embodiments, the tournament creation page 94 can display different tournament variables 96 and different options 98 for each variable 96 from which the user can select. In some embodiments, the user can navigate to the tournament creation page by selecting a "create new tournament" link 100 on the tournament main page 84 or by selecting "create tournament" under the link to the tournament main page 84.

In some embodiments, the tournament creation page 94 can comprise several different tournament variables 96. For example, in some embodiments, the tournament variables 96 can comprise a tournament name 102, a tournament description 104, a maximum number of players 106, a tournament type 108, a number of players paid out 110 (i.e., a prize disbursement structure), a tournament fee 112 (i.e., the entry fee that feeds the prize pool), a bankroll 114, tracks and dates 116, bet types 118, a minimum total number of wagers 120, maximum total number of wagers 122, a minimum amount per wager 124, a maximum amount per wager 126, minimum number of wagers for every race 128, and a maximum number of wagers for every race 130. In some embodiments, the tournament creation page 94 can include combinations of the previously mentioned variables, and in other embodiments, the tournament creation page 94 can include other similar variables.

In some embodiments, the tournament creation page 94 can include at least one option 98 for at least some of the variables 96. In some embodiments, depending on the variables 96, the options 98 can comprise different potential values. In some embodiments, the tournament creation page 94 also can include at least one field 97 corresponding to some of the variables 96. The field 97 can be configured to receive option data input by the user. For example, in some embodiments, variables 96 such as, but not limited to, the tournament name 102 and tournament description 104 can be limited only by a maximum number of characters the user inputs, and the user can input substantially any characters for these variables 102, 104 into the corresponding field. For some other variables 96, such as, but not limited to the tournament type 108, the number of players paid out 110, the tournament fee 112, etc., two options can include at least one pre-determined option and a custom option field 97. More specifically, in some embodiments, some of the variables 96 can include pre-determined options 98 from which the user can select, and, in some embodiments, the user can select the custom setting and input an option into the field 97. For example, for the bankroll option 114, when creating a tournament, the user can select from a pre-determined list of bankroll variables (i.e., $20, $50, $100, $200, or $500) or the user can select "custom" and input, into the field 97, a funds amount not present in the pre-determined list of bankroll variables (i.e., $125). In some embodiments, the operational parameters can substantially comprise the options input by the user for each of the variables so that the user's options selections generally manifest as the rules governing the player made tournament.

By way of example only, the following table describes different variables ("fields") and different options ("possible values") that a user can choose from, according to some embodiments of the invention, while creating a tournament.

| Field | Description | Possible Values | Default Value |
|---|---|---|---|
| Contest Name | Contest Name | String (20 Chars) | <Blank> |
| Max Number of Players | Maximum number of players allowed to join the contest. | Custom Number (2-9999) or Unlimited | Unlimited |
| Contest Type | Type of contest | Bankroll-Player with highest bankroll at the end of the contest wins. ROI-Player with highest return on investment at the end of the contest wins | Bankroll |
| Number of Players Paid Out | Number of Players Paid Out. If value is greater than one then user has to specify percentage amount for each payout. | 1-6 | 1 |
| Bankroll | Amount of money each player begins with. This amount will be deducted from player's account. | $20, $50, $100, $200, $500 or Custom Amount ($2-$9999) | $100 |
| Tournament Fee | Amount of money that will be added to the prize pool | ($0-$9999) | $20 |
| Tracks and Dates | Tracks and Dates players can bet on for the contest. | | None |
| Bet Types | Possible bet types player can use as a qualified contest wager. | Win, Place, Show, Exacta, Trifecta, Superfecta, Daily Double, Pick 3, Pick4. | Win |
| Minimum Total Number of Wagers | Least number of wagers a player must make in order to not be disqualified from the contest | Number (1-999) | 1 |
| Maximum Total Number of Wagers | Most number of wagers a player can make and not be disqualified from the contest | Number (1-999) or Unlimited | Unlimited |
| Minimum Amount per Wager | Least possible wager value a player can make and to qualify as a contest wager. | Number (1-9999) | $1 |
| Maximum Amount per Wager | Highest possible wager value a player can make and to qualify as a contest wager. | Number (1-999) or Unlimited | Unlimited |
| Minimum Number of Wagers per Race | Least number of wagers a player must make in each race of every track in the contest. | Number (1-99) | 0 |
| Maximum Number of Wagers per Race | Most number of wagers a player can make in each race of each track in the contest. | Number (1-999) or Unlimited | Unlimited |

Figure 6:
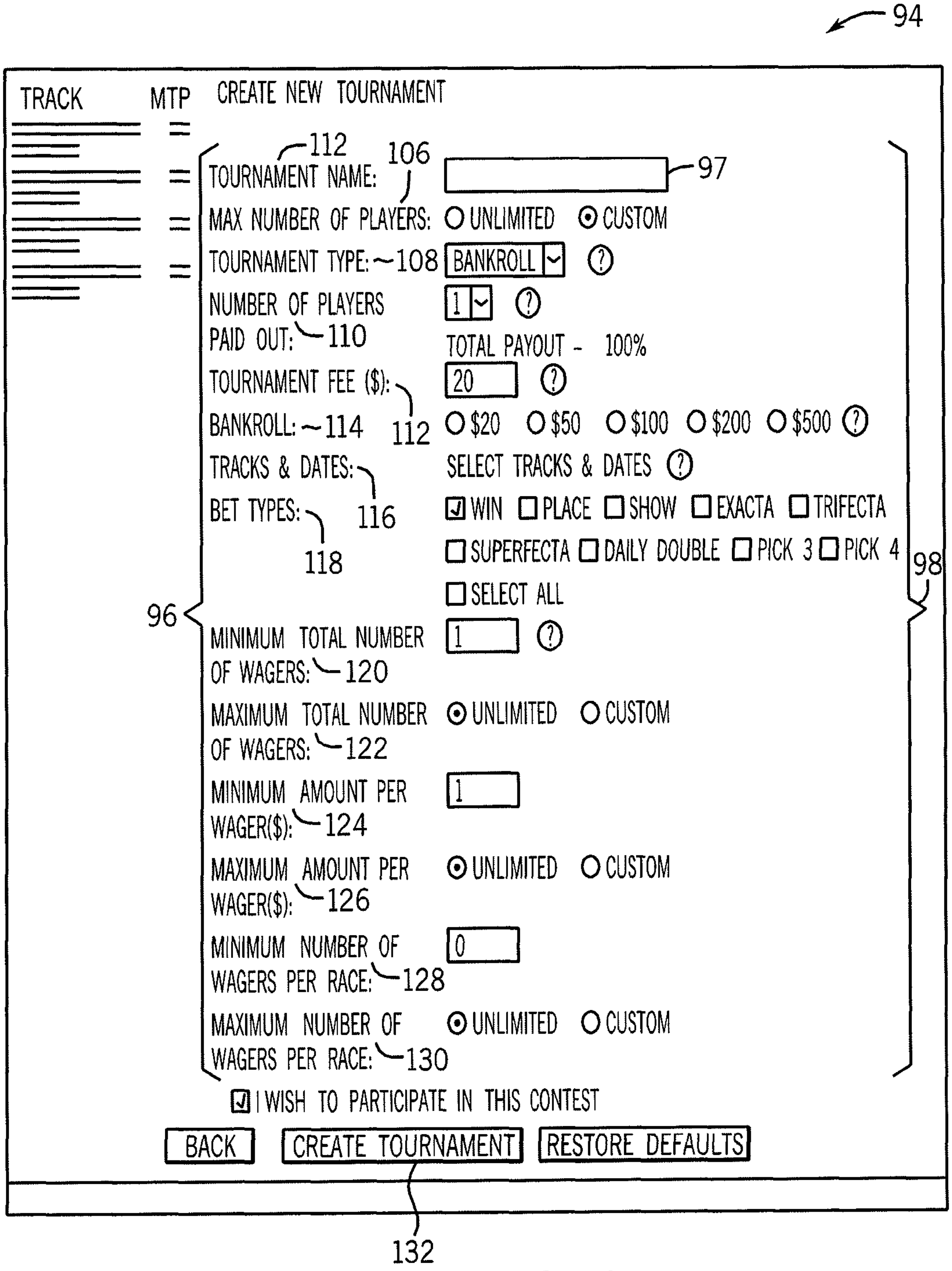
FIG. 6 is a partially completed "tournament creation page" screen shot from a web-based program controlled by the player made tournament application according to one embodiment of the invention.

According to some embodiments, as shown in FIG. 6, the user can input and/or select the options 98 for each of the variables 96 to create their own tournament. For example, the user can select whether the tournament is a bankroll-type tournament or an ROI-type tournament. More specifically, in some embodiments, the user can determine whether the overall winner of the tournament is the individual with the largest bankroll after all of the races comprising the tournament are substantially completed. In other embodiments, the user can determine whether the overall winner of the tournament is the individual who earned the largest return on their investment based on their wagers during the races comprising the tournament, as calculated by the application running the web-based program. Also, in some embodiments, the user can determine prize distribution. In some embodiments, the user can determine whether the winner receives 100% of the prize pool (i.e., a winner-takes-all tournament) or the prize pool can be divided among the top-finishing participants, be it with a top-finishing bankroll or a top-finishing ROI.

Figure 7:
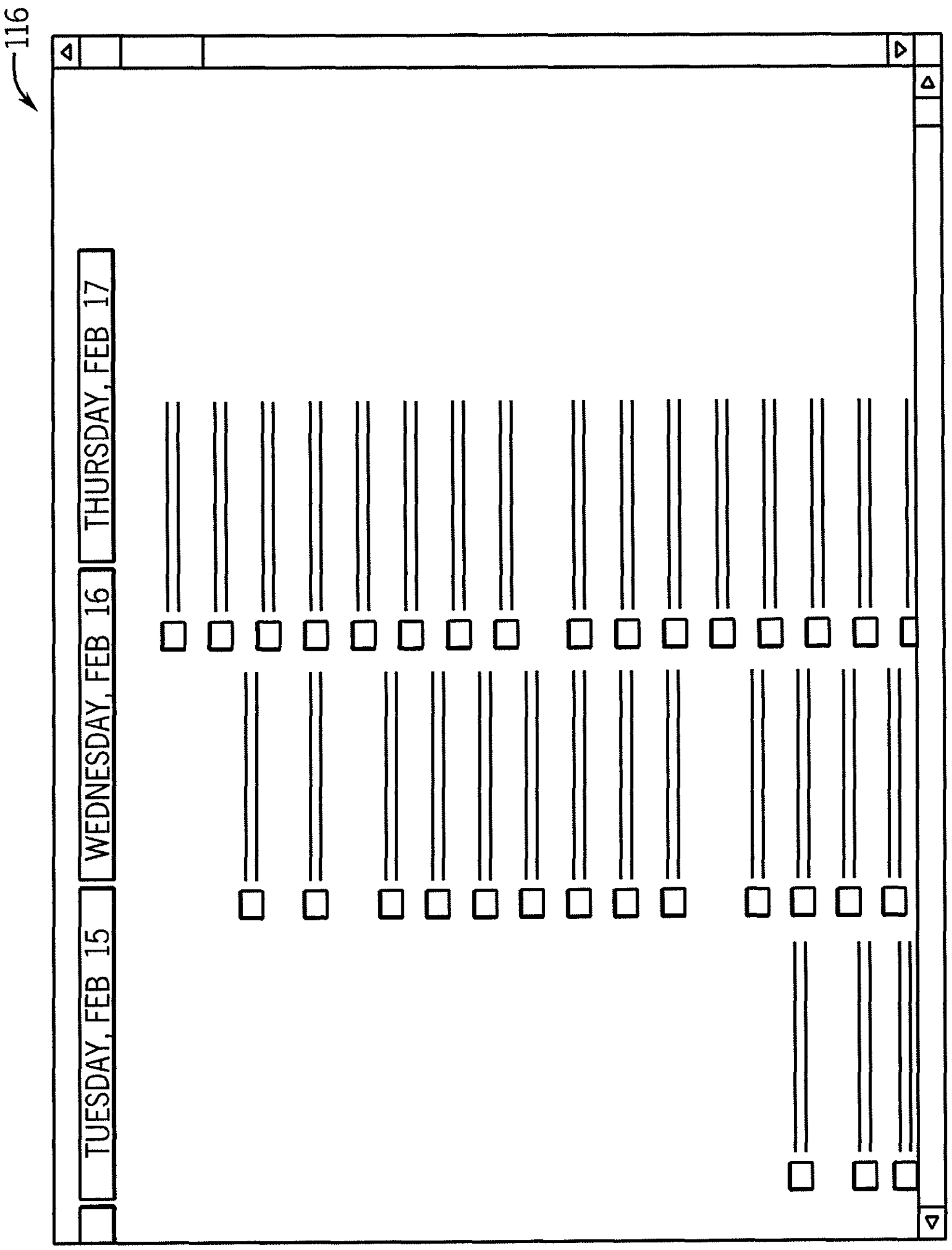
FIG. 7 is a "track and date schedule page" screen shot from a web-based program controlled by the player made tournament application.

Moreover, in some embodiments, the user can input options into the select tracks and dates 116 variable by selecting races at certain tracks on certain dates. By selecting the select tracks and dates 116 variable, the user can be presented with list including real tracks and real times of real races occurring throughout North America for up to two weeks in advance. In some embodiments, the user can select tracks and dates from locations in different countries throughout the world. FIG. 7 illustrates a sample track and date schedule page including a schedule of dates and tracks the user can choose from after selecting the tracks and dates 116 variable. In some embodiments, the user can select at least one track and date from the list, and in other embodiments, the user can select multiple tracks and dates from the list. In some embodiments, the selected tracks and dates 116 can substantially determine the start and end of the tournament.

The server database can store information regarding tournaments, tracks, and users in database tables. The information can be updated manually via information from a user or an application administrator or automatically (e.g., information about tracks can be automatically updated according to dates available).

The following database table can include information regarding tournaments. In one embodiment, a new database table can be created and stored in the server database for each tournament created.

| Field | Date Type | Description |
|---|---|---|
| CNTST_ID | NUMBER NOT NULL | Contest ID |
| NM | VARCHAR2(20) NOT NULL | Contest Name |
| STRT_DT | DATE | Start Date |
| END_DT | DATE | End Date |
| CNTST_FEE | NUMBER(7,2) | Contest Fee |
| BNKRLL | NUMBER(7,2) | Player's Initial Bankroll |
| STTS | VARCHAR2(255) | Contest Status Possible Values: Open In Progress Closed |
| BT_TYP | NUMBER | Bet Type |
| MN_NMBR_WGR | NUMBER | Min # of Wagers |
| MX_NMBR_WGR | NUMBER | Max # Wagers −1 = unlimited. |
| MN_WGR | NUMBER | Min wager amount |
| MX_WGR | NUMBER | Max # Wagers −1 = unlimited. |
| MN_RC_WGR | NUMBER | Minimum wager per race |
| MX_RC_WGR | NUMBER | Maximum wager per race. −1 for unlimited |
| PRZ_1 | NUMBER NOT NULL | Percentage of prize pool awarded for 1st place. |
| PRZ_2 | NUMBER | Percentage of prize pool awarded for 2nd place. |
| PRZ_3 | NUMBER | Percentage of prize pool awarded for 3rd place. |
| PRZ_4 | NUMBER | Percentage of prize pool awarded for 4th place. |
| PRZ_5 | NUMBER | Percentage of prize pool awarded for 5th place. |
| PRZ_6 | NUMBER | Percentage of prize pool awarded for 6th place. |

The following database table can include information regarding tracks. In one embodiment, a new database table can be created and stored in the server database for each track available in each tournament.

| Field | Data Type | Description |
|---|---|---|
| CNTST_TRCK_ID | NUMBER NOT NULL | Contest Track ID |
| CNTST_ID | NUMBER | Contest ID |
| TS_ID | NUMBER | Track Schedule ID |

The following database table can include information regarding users. In one embodiment, a new database table can be created and stored in the server database for each user in each tournament.

| Field | Data Type | Description |
|---|---|---|
| CNTST_PLYR_ID | NUMBER NOT NULL | Contest Player ID |
| CNTST_ID | NUMBER | Contest ID |
| USR_ID | NUMBER | User ID |
| BNKRLL | NUMBER (7, 2) | Player's Current Bankroll for contest |
| ROI | NUMBER (7, 2) | Player's Current Return on Investment. |

Figure 8:
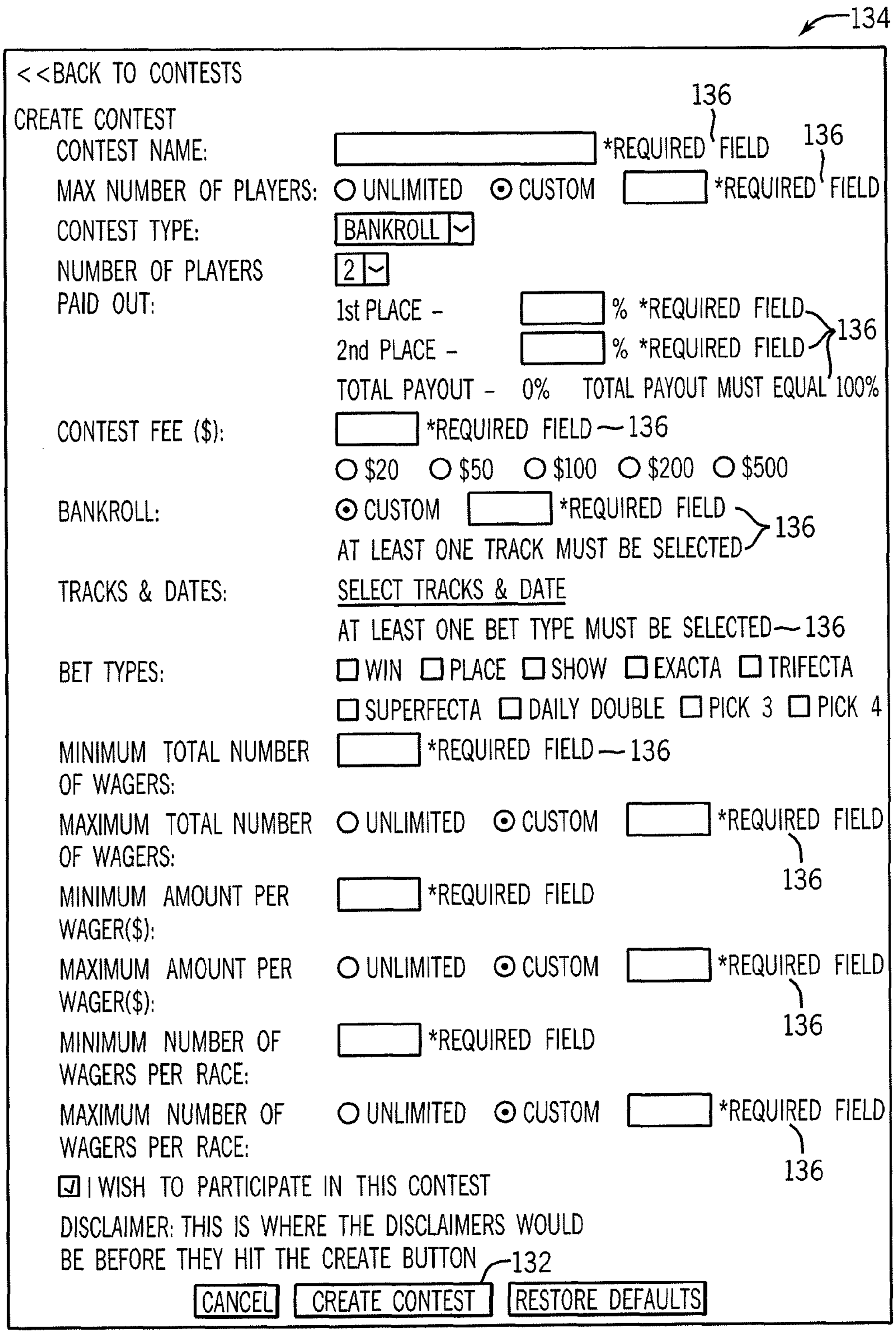
FIG. 8 is a partially completed "tournament creation page" screen shot from a web-based program controlled by the player made tournament application.

In some embodiments of the inventions, after the user inputs the options 98 for all of the variables 96 displayed on the tournament creation page 94, the user can select a "Create Tournament" button 132. In some embodiments, after selecting the "create a tournament" button, the application can receive the information and can cause the processor to process the operational parameters to substantially create the player made tournament. If the user properly inputs substantially all of the options 98 for all of the variables 96, and then the user selects the create tournament button 132, the user can create a player made tournament. In some embodiments, if the user improperly inputs some of the variables 98, an error page 134 can be displayed and the user can be alerted to any potential errors on the tournament page 96 via an error message 136, as shown in FIG. 8.

In some embodiments, after the user creates the tournament, the player made tournament can be displayed in the "Player Made Tournament" table 56 on the tournament main page 54. Additionally, in some embodiments, the user who created the player made tournament can invite others to join the tournament as contestants, and also, can allow substantially any other users to join the tournament.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, other optical and non-optical data storage devices, or any other physical or material medium which can be used to tangibly store the desired information or data or instructions and which can be accessed by a computer or processor. The computer readable medium can also be distributed over a network coupled computer systems so that the computer readable code may be stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

The invention claimed is:

1. A computer implemented method for creating a player made tournament, the method comprising:

providing a tournament creation page for display by a player using a computing device, the tournament creation page including a plurality of variables, and at least one option for each of the plurality of variables, the at least one option including a player defined number of players within the tournament stored in a computer readable media;

receiving the at least one option for each of the plurality of variables, operational parameters of the player made tournament substantially comprising the at least one option for each of the plurality of variables received;

processing by a computing device the operational parameters to create a player made tournament;

displaying the player made tournament on a tournament main page;

wherein the plurality of variables comprises a tournament name, a tournament fee, and a bankroll; and wherein the plurality of variables further comprises a tournament description, a tournament type, a number of players paid out, a tracks and dates selection, a plurality of bet types, a minimum number of wagers, a maximum number of wagers, a minimum amount per wager, a maximum amount per wager, a minimum number of wagers per race, and a maximum number of wagers per race.

2. A computer implemented method for operating a player made tournament for real-life sporting events, the method comprising:

receiving a request to create a player made tournament for real-life sporting events;

providing a tournament creation page for display by a user by a computing device, the tournament creation page including a plurality of variables and at least one field corresponding to each of the plurality of variables, the at least one field configured to receive an option for the corresponding variable;

receiving options for each of the plurality of variables, operational parameters for the player made tournament for real sporting events substantially comprising the options for each of the plurality of variables received the at least one option including a player defined number of players within the tournament stored in a computer readable media;

processing by a computing device the operational parameters to create a player made tournament for real-life sporting events;

displaying the player made tournament for real-life sporting events on a tournament main page, the tournament main page including a display of at least a portion of the operational parameters of the player made tournament for real-life sporting events; and receiving requests to participate in the player made tournament for real-life sporting events and allowing the number of players within the tournament to be defined by the player;

wherein the real-life sporting events comprise horse racing;

wherein the real-life sporting events comprise dog racing; and wherein the plurality of variables comprises a tournament name, a tournament fee, a bankroll, a tournament description, a tournament type, a number of players paid out, a tracks and dates selection, a plurality of bet types, a minimum number of wagers, a maximum number of wagers, a minimum amount per wager, a maximum amount per wager, a minimum number of wagers per race, and a maximum number of wagers per race.

3. A system for creating a player made tournament, the system comprising:

at least one computer server having a processing unit and a database, the at least one computer server configured to:

receive and process a request to create a player made tournament;

display a tournament creation page in response to the request to create a player made tournament, the tournament creation page including a plurality of variables and at least one option for each of the plurality of variables, the at least one option including a player defined number of players within the tournament stored in a computer readable media;

receive the at least one option for each of the plurality of variables, operational parameters of the player made tournament comprising the at least one option for each of the plurality of variables received;

process the operational parameters using the processing unit to create a player made tournament;

store the operation parameters in the database of the computer server; and display the player made tournament on a tournament main page;

wherein the player made tournament comprises real-life sporting events; and wherein the plurality of variables comprise a tournament name, a tournament fee, a bankroll, a tournament description, a tournament type, a number of players paid out, a tracks and dates selection, a plurality of bet types, a minimum number of wagers, a maximum number of wagers, a minimum amount per wager, a maximum amount per wager, a minimum number of wagers per race, and a maximum number of wagers per race.

* * * * *